United States Patent [19]

Mullins

[11] Patent Number: 5,540,250
[45] Date of Patent: Jul. 30, 1996

[54] QUICK-DISCONNECT FLUID COUPLING

[75] Inventor: Randall J. Mullins, Matthews, N.C.

[73] Assignee: Perfecting Coupling Company, Charlotte, N.C.

[21] Appl. No.: 215,845

[22] Filed: Mar. 22, 1994

[51] Int. Cl.$^6$ .................................................... F16L 35/00
[52] U.S. Cl. ......................... 137/77; 137/75; 251/149.6; 285/1
[58] Field of Search ............................ 137/72, 74, 75, 137/77, 79, 614.04; 251/149.6; 285/1, 2

[56] References Cited

U.S. PATENT DOCUMENTS

| | | | |
|---|---|---|---|
| 2,017,668 | 10/1935 | Meagher | 137/72 X |
| 2,048,388 | 7/1936 | Johnsen | 137/75 X |
| 2,642,297 | 6/1953 | Hanna | 285/304 |
| 2,860,893 | 11/1958 | Clark | 285/1 |
| 2,950,022 | 8/1960 | Boyer | 137/72 X |
| 2,952,482 | 9/1960 | Torres | 285/1 |
| 3,245,423 | 4/1966 | Hansen et al. | 137/74 |
| 3,532,101 | 10/1970 | Snyder, Jr. | 137/75 |
| 3,690,336 | 9/1972 | Drum | 137/75 |
| 3,858,601 | 1/1975 | Ensinger | 137/75 X |
| 4,088,436 | 5/1978 | Alferes | 137/74 X |
| 4,124,228 | 11/1978 | Morrison | 285/1 |
| 4,280,523 | 7/1981 | Norton | 137/74 |
| 4,290,440 | 9/1981 | Sturgis | 251/149.6 X |
| 4,334,549 | 6/1982 | Burch et al. | 137/72 |
| 4,394,874 | 7/1983 | Walter | 251/149.6 X |
| 4,398,561 | 8/1983 | Maldavs | 251/149.6 X |
| 4,537,346 | 8/1985 | Duprez | 137/72 X |
| 4,613,112 | 9/1986 | Phlipot et al. | 251/149.6 |
| 4,682,795 | 7/1987 | Rabushka et al. | 285/1 |
| 4,691,941 | 9/1987 | Rabushka et al. | 285/1 |
| 4,825,893 | 5/1989 | Gailey | 137/75 |
| 4,905,733 | 3/1990 | Carow | 137/614.04 |
| 4,911,194 | 3/1990 | Lechner | 137/75 |
| 4,915,351 | 4/1990 | Hoffman | 251/149.1 |
| 4,922,944 | 5/1990 | Mueller et al. | 137/72 |
| 4,932,431 | 6/1990 | Silagy | 137/75 X |
| 5,080,132 | 1/1992 | Manz et al. | 251/149.6 X |
| 5,109,881 | 5/1992 | Baker | 137/72 |
| 5,172,723 | 12/1992 | Sturgis | 251/149.1 X |
| 5,213,309 | 5/1993 | Makishima | 251/149.6 |

OTHER PUBLICATIONS

American Gas Association Brochure, American National Standard for Quick–Disconnect Devices For Use With Gas Fuel, Fourth Edition, ANSI Z21.41–1989, Jan. 16, 1989, (And Accompanying Addenda—ANSI Z21.41a–1990 and ANSI Z21.41b–1992).

Tuthill Corporation, Hansen Coupling Division Catalog on One–Way Shut–Off Couplings, No. 87-3, 1988.

*Primary Examiner*—John Rivell
*Attorney, Agent, or Firm*—Bell, Seltzer, Park & Gibson P.A.

[57] ABSTRACT

A ball detent fluid coupling for gas fuel for appliances and the like equipment is characterized by push-to-connect and pull-to-disconnect features, a heat responsive breakaway feature, and a ball retaining sleeve that is retractable by hand for joining and for separating the socket and plug. The sleeve has a shoulder projecting radially inwardly with an inclined surface for engaging the balls. The spring for the sleeve is urged against the shoulder by a fusible stop ring that is matingly mounted on an inclined shoulder on the socket. The stop ring fuses at a predetermined temperature, the spring is released, and the sleeve releases the ball detents from engagement with the plug. A valve in the fluid flow passageway urges the plug out of coaxial coupled relation and stops the flow of fuel when the plug and socket are released from coaxial coupled relation.

11 Claims, 2 Drawing Sheets

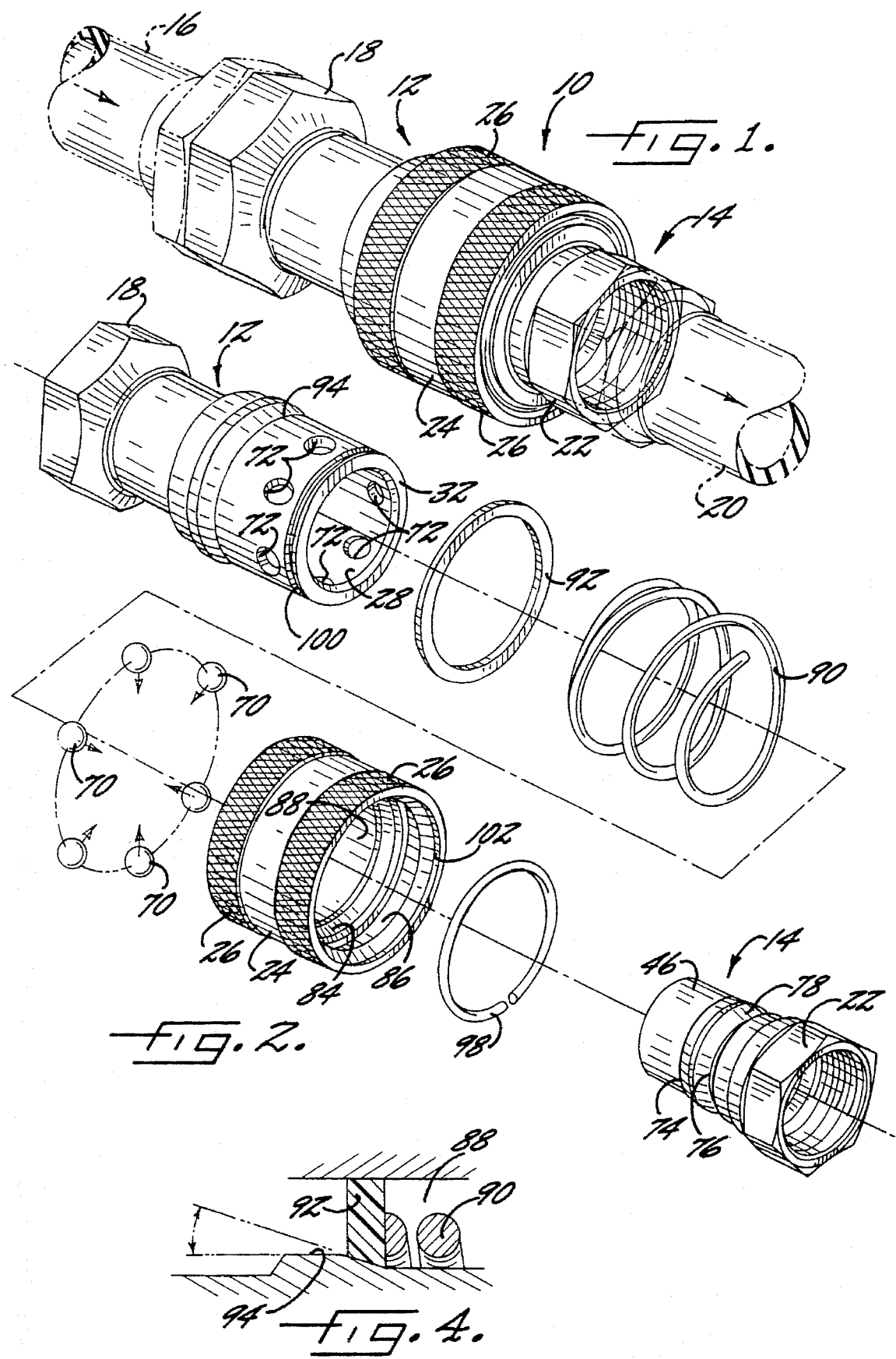

5,540,250

QUICK-DISCONNECT FLUID COUPLING

FIELD OF THE INVENTION

The invention claimed herein relates to quick-disconnect couplings for use in quickly connecting gas fuel supplies to and disconnecting gas fuel supplies from appliances, space heaters, outdoor grills, and the like equipment. These couplings generally are equipped with means for shutting off the fuel when the mating parts of the coupling are disconnected. The invention also relates to quick-disconnect couplings having the additional capability of shutting off the flow of gas fuel to the appliance or other equipment in the event of a fire.

BACKGROUND OF THE INVENTION

The American Gas Association has published an American National Standard and addenda thereto for acceptable performance for quick-disconnect devices for use with gas fuel at relatively low pressures. Standard Z21.41, entitled *Quick-Disconnect Devices For Use With Gas Fuel*, was approved on Jan. 16, 1989 by the American National Standards Institute. The Standard sets forth at page 1, among other requirements, that the quick-disconnect devices "shall be equipped with automatic means to shut off the gas when the devices are disconnected." Under the Standard, the mating parts of the quick-disconnect device can be disconnected by manual engagement or by providing opposing separating forces on the coupling members.

The quick-disconnect devices described in the Standard are used in a variety of applications. For example, most restaurants, and virtually all fast food restaurants, use a quick-disconnect coupling in connection with a deep fryer that is heated with natural gas fuel. The deep fryer normally has a hose for receiving fuel that is connected by a quick-disconnect coupling to a source of the fuel.

Problems have arisen in the use of gas fuel for heating deep fryers. Deep fryers heat flammable oils to high temperatures and are prone to frequent fires. Many quick-disconnect couplings that shut off the flow of gas when disconnected are disconnected by hand. Pulling a deep fryer away from a wall for cleaning or other purposes can break the hose connections without disconnecting the coupling members, enabling natural gas to spill out and possibly to ignite.

Other quick-disconnect couplings can be pulled apart by applying opposing separating forces on the coupling members, such as by pulling on an appliance hose where the coupling member on the supply side to the appliance is rigidly mounted. However, many restaurant employees are accustomed to disconnecting the quick-disconnect devices by hand and may not realize under stress that a particular coupling can be disconnected by pulling on the fuel hose or appliance, but may not be disconnectable through manual engagement.

The presence of a gas line through which gas is flowing in an area prone to frequent fires causes some concern beyond shutting off the supply of gas in the event that the appliance is disconnected from the fuel source. When a fire or other sudden heat rise condition occurs, then it is desirable to shut off the flow of gas whether or not the mating parts of the quick-disconnect device are separated. A danger exits that the fuel source could be ignited when the appliance and the fuel source are connected and fuel is flowing. The fuel could exacerbate an existing fire or result in an explosion.

Several patents describe various quick-disconnect devices for use in gas fuel supply lines for appliances such as deep fryers, space heaters, outdoor grills, and the like, that provide a means for shutting off the flow of gas fuel in the event of a fire or other sudden heat rise condition. For example, Gailey U.S. Pat. No. 4,825,893 relates to a coupling with a socket assembly that has a heat fusible element to enable a mating plug to be withdrawn from the socket assembly and gas flow to stop on exposure to excessive heat. The heat fusible portion of the retaining assembly can be the retaining element or the sleeve. When the fusible element is exposed to heat and fails, then the plug is ejected from the socket by a spring biased valve. The valve shuts off the flow of gas. In normal operation, the sleeve is axially retracted by hand to release the retaining elements for inserting the plug for coupling with the socket and for releasing the plug for withdrawal. Pull-to-disconnect features are not disclosed.

In the Gailey patent, the retaining elements can be retaining balls or retaining elements with a cylindrical or pin-shaped configuration. The heat fusible elements are made of a polymeric material sold under the trademark DELRIN® that loses its rigidity and is reduced to a plastic state when heated to a temperature in excess of 200° F.

Typically, however, it is desirable to use steel for the retaining elements and brass, steel, or some other suitable metal for the sleeve. The retaining elements and sleeve are moving parts and can be subjected to a number of stresses. Use of plastic elements could adversely impact the useful life and operating characteristics of these couplings.

Snyder U.S. Pat. No. 3,532,101 discloses a gas coupling designed to connect a gas appliance to a source of gas under low pressure. A valve that shuts off the flow of gas from the gas supply is contained in a socket within a fixed housing. The mating plug includes an unmelted solder ring in an annular groove in the wall of the flow passageway. The solder ring causes the valve to move axially to the open position when the plug is inserted into the housing. In the event of a fire, the solder ring melts and permits the valve to close as a safety feature. However, the plug and socket remain in coaxial coupled relation and are not separated.

The coupling members described in the Snyder patent can be separated simply by pulling on the plug. However, the retaining element is a coiled spring that is held in a coupling housing that is mounted in a standard electrical box and is not operable by hand for insertion of the plug into the socket or release of the plug from the socket. Typically, couplings used with gas appliances are ball detent couplings, which may provide a more secure coupling engagement.

Hansen et al. U.S. Pat. No. 3,245,423 relates to a ball detent coupling having a fusible material for closing the valve on the supply side of the coupling in the event of a fire or excessive heat. The fusible material is located in the fluid passageway. In one embodiment, a nose member is mounted in the flow passageway of the plug by a band of solder. The nose member opens a spring biased valve when the plug and socket are connected. When the solder fuses, the nose member moves in response to the spring biased valve and allows the valve to close. The socket and plug remain locked in coaxial coupling relation. Manufacture of such a coupling requires extra steps to insert the nose member into the plug fluid passageway and to solder the nose member in place. Also, the plug and socket are connected and disconnected by retracting the sleeve by hand to insert or withdraw the plug. Pull-to-disconnect features are not disclosed.

Hansen Coupling Division of Tuthill Corporation in Cleveland, Ohio presently sells couplings under the trademark GAS-MATE® that are somewhat similar to that described in U.S. Pat. No. 3,245,423. One such coupling has two sets of radially extending ball detents circumscribing the socket. The two sets of detents are not in the same plane through the socket. In addition to the step of inserting the nose member into the plug and fixing it in place, two separate sets of ball retaining apertures are drilled in the socket to accommodate the two sets of detents. The result is a push-to-connect coupling with a heat responsive feature for stopping gas flow. However, the coupling elements remain connected in the event of a fire. Also, the coupling is disconnected by manual engagement by retracting the ball retaining sleeve by hand, and is not disconnectable by applying opposing separating forces on the socket and plug. A restaurant employee or fireman could not move a deep fryer away from a wall or out of a particular area without either taking time to operate the quick-disconnect device by hand or otherwise breaking the hose connections, even where the gas flow has been shut off.

Norton U.S. Pat. No. 4,280,523 discloses a coupling in which the plug body carries a collar for engaging the retaining balls in the socket. The collar is held in place on the plug by a temperature responsive annular fusible body of a material such as solder. When the temperature responsive body is melted, the collar and plug are disengaged and the plug is ejected from the socket. The collar remains in the socket. The device described in the Norton patent is disconnected normally by retracting the sleeve, and involves additional parts for the plug.

Thus, available quick-disconnect devices for gas fuel generally do not address all of the problems that can arise in the manufacture and use of such devices. While individual solutions have been proposed for specific problems, other problems are either not addressed or arise as a direct result of the proposed solution.

SUMMARY OF THE INVENTION

This invention includes a fluid coupling for fluid conducting lines that is of simple construction, has a minimum of components, and includes push-to-connect and pull-to-disconnect features in combination with a means for joining and for separating the coupling members by sliding movement applied to a sleeve associated with the coupling. The sleeve can be moved by hand to effect coupled relation or release from coupled relation and interrupt the flow of fluid through the coupling. A predetermined separating force can be applied to at least one of the coupling members to effect release of the coupled relation and interrupt the flow of fluid through the coupling. The coupling including these features of the invention is easily connected and disconnected while maintaining secure coupling at operating pressures and substantially precluding fuel leaks.

The invention also includes a heat responsive feature for stopping fuel flow and a means for stopping fuel flow when the coupling members are separated. More specifically, the heat responsive feature is a breakaway feature.

The pull-to-disconnect feature of the invention enables an operator effect release of the coupling from coaxial coupled relation and to interrupt the flow of fluid through the coupling by applying a predetermined separating force to at least one of the coupling members. The separating force can be applied by manually engaging the coupling by, for example, pulling on at least one of the coupling members. Or, if desired, the separating force can be applied by moving appliances and other gas-fired equipment connected to the coupling without manual engagement of the coupling. Thus, the coupling members can be easily separated by using the pull-to-disconnect features or the slideable sleeve, which provides flexibility in panic situations.

The equipment can be moved and the fuel flow stopped whether or not a predetermined temperature has been reached. If a predetermined temperature is reached and the coupling includes the temperature responsive breakaway feature, then the coupling members quickly separate, stopping the flow of fuel and substantially simultaneously disconnecting the source of fuel from the appliance or other equipment.

In one embodiment, the coupling of the invention is a fluid coupling for fluid conducting lines. The coupling comprises a generally cylindrical first member and a generally cylindrical second member. The first and second members each have an axial fluid flow passage and a coupling end portion that is coupleable with the coupling end portion of the other member. When coupled, a single fluid flow passage is defined through the first and second members. The coupling also includes means cooperating with the first and second members for releasably securing the first and second members in coaxial coupled relation. The releasable securing means includes means for normally urging the first and second members of the coupling to remain in coaxial coupled relation. The releasable securing means is releasable by slideable movement applied to a sleeve associated with at least one of said first and second members. The securing means is also separately releasable upon application of a predetermined separating force applied to the coupling members to effect release of the coupled relation and interrupt flow of fluid through the coupling.

More specific embodiments include means for shutting off the flow of fluid when the coupling members are separated. Still more specifically, the securing means is responsive at a predetermined temperature to release the coupling members from coaxial coupled relation and the coupling includes means for shutting off the flow of fluid when the coupling members are released.

In some of these more specific embodiments, the means for normally urging the coupling members to remain in coaxial coupled relation is responsive to a predetermined temperature and comprises a material that is fusible at the predetermined temperature. The urging means releases the coupling members from coaxial coupled relation at the predetermined temperature and the means for shutting off the flow of fluid also causes the coupling members to separate to provide a heat responsive breakaway feature.

In somewhat still more specific embodiments, the invention includes a ball detent coupling for gas fuel for appliances. The coupling has a socket and a mating plug. A plurality of ball detents is carried in radially directed and circumferentially spaced apertures in the coupling end portion of the socket. A ball retaining sleeve circumscribes the coupling end portion of the socket for releasably securing the ball detents in engagement with a race on the plug. The sleeve has a shoulder projecting radially inwardly with an inclined surface for engaging the ball detents in a radially inward position. The shoulder defines on one side between the sleeve and the socket a first annular passage into which the ball detents are received in a radially outward position for inserting and removing the plug from the socket. The shoulder defines on the other side a second annular passage for a helical compression spring. The spring urges the ball retaining sleeve to maintain the ball detents in a radially inward position. The spring urges the ball retaining sleeve against a stop ring that is associated with the socket. In one embodiment, the stop ring comprises a fusible material. In another embodiment, the stop ring is made of steel or other suitable material and rests upon a surface of fusible material, such as a snap ring of solder that is associated with the socket.

In even more specific embodiments the socket includes an inclined shoulder that extends radially outwardly from the socket. The stop ring of fusible material has a mating inclined shoulder and is mounted on the inclined shoulder on the socket. When the stop ring is fused, the spring is released and the plug and socket are released from coaxial coupled relation.

In another even more specific embodiment, a valve is mounted in the fluid flow passage of the socket and has a spring associated with it for substantially stopping the flow of gas fuel through the flow passageway of the socket and for urging the plug to separate from the socket. The plug opens the valve when the plug is inserted into the socket so that fuel can flow through the fuel flow passage. The valve stops fuel flow when the plug and socket are disconnected, whether by hand, by application of opposing separating forces, or in response to the heat induced breakaway feature, if included.

Thus, the invention provides, among other things, a ball detent coupling that is useful for gas-fired appliances, that has fewer parts than typical couplings, and that includes push-to-connect and pull-to-disconnect features, can be manually disconnected by hand retracting the ball retaining sleeve, that has a means for stopping the flow of fluid when the plug and socket are separated, that is responsive to predetermined temperatures such as occur in sudden heat rise conditions or fires, and that is a breakaway coupling at the predetermined temperature to separate the appliance from the source of fuel.

BRIEF DESCRIPTION OF THE DRAWINGS

FIG. 1 represents a perspective view of an embodiment of a coupling of the invention having the plug in coaxial coupling engagement with the socket.

FIG. 2 represents the coupling of FIG. 1 in exploded perspective.

FIG. 3A represents the disconnected plug and socket oriented for coupling. FIGS. 3B through 3D represent the plug at various stages of insertion into the socket. FIG. 3E represents the plug fully inserted into the socket for coupling engagement.

FIG. 4 represents an enlarged portion of the coupling as represented in FIGS. 3B through 3E.

Corresponding reference characters indicate corresponding parts throughout the several views of the drawings.

DESCRIPTION OF THE PREFERRED EMBODIMENTS

Figure 3A:
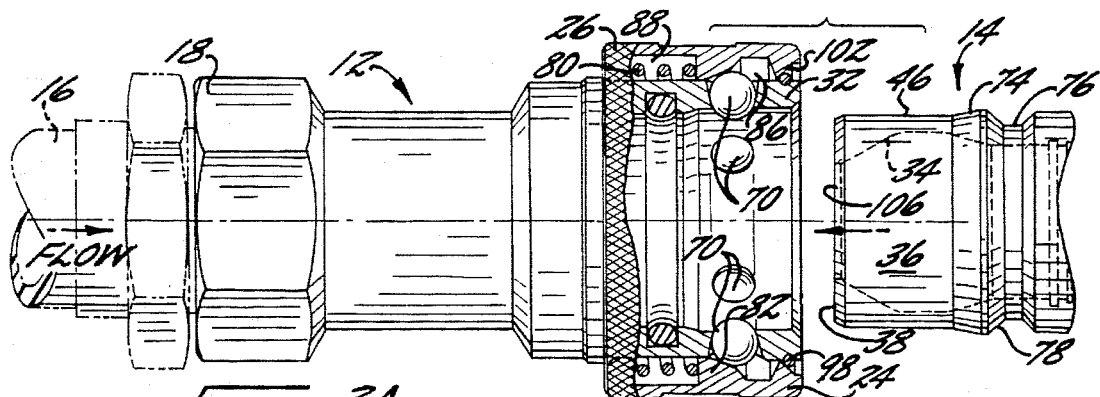
FIGS. 3A through 3E represent partial longitudinal sections of the coupling of FIG. 1 and show in sequence the plug being inserted into the socket for coaxial coupling engagement.

FIG. 1 represents a coupling of the invention designated at 10 for use with natural gas fuel at relatively low fuel flow pressures of about 0.5 psig for appliances such as deep fryers and the like. Coupling 10 has a generally cylindrical first member shown as a socket 12 and a generally cylindrical second member shown as a mating plug 14 positioned for insertion into the socket. The socket and plug are coupled to form an internal fluid flow passage between a line 16 that is attached to the socket at a flanged and internally threaded portion 18 of the socket and another line 20 that is attached to the plug at a similarly flanged and threaded portion 22. The socket carries a circumscribing sleeve 24 having knurled portions 26 for convenience in retracting the sleeve by hand. A flow of natural gas fuel through the coupling is shown by an arrow to be progressing from the socket side of the coupling to the plug side of the coupling.

It should be understood that either the plug or the socket can carry the sleeve and that one of skill in the art should be able to use the principles elucidated hereinbelow to construct such a coupling. Additionally, flow can progress in either direction depending on the orientation of the coupling with the fuel source. Typically, for use in gas fuel applications, the socket carries the sleeve and is rigidly mounted and connected to the source of fuel on the supply side. The plug normally is mounted to a flexible hose connected to an appliance. A valve is present in the socket on the supply side for stopping the flow of fuel from the supply side when the socket and plug are disconnected. For low pressure applications, a valve typically is not considered necessary on the appliance side.

Figure 3B:
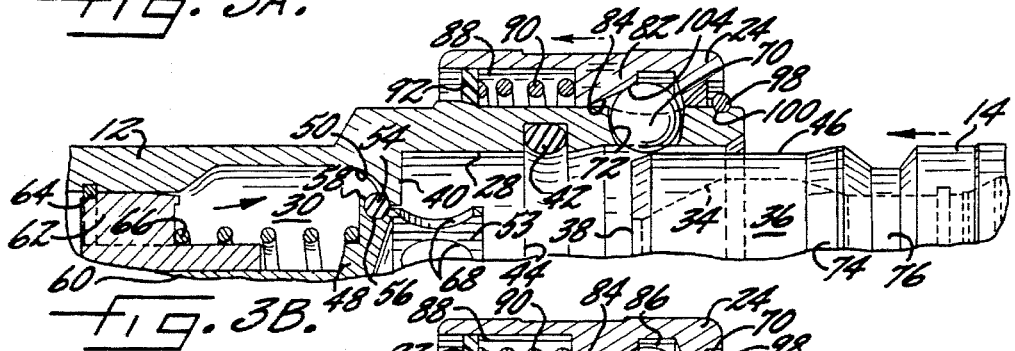
Figure 3C:
Figure 3D:
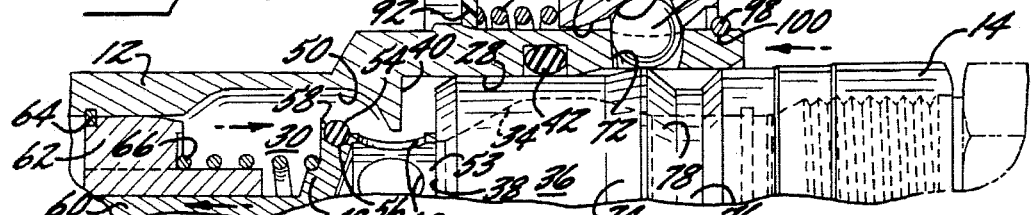
Figure 3E:
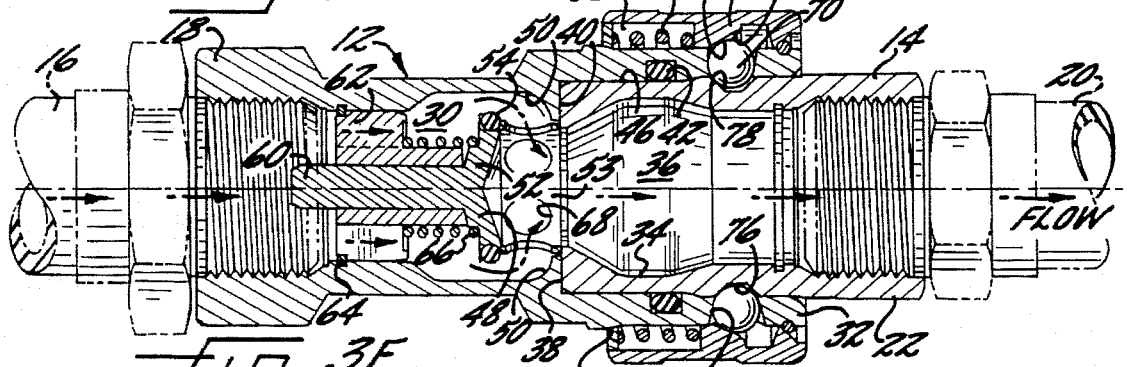

Referring now to FIGS. 3B through 3E, socket inner wall 28 defines an axial fuel flow passage 30 extending through the socket from the coupling end 32 of the socket to internally threaded and externally flanged portion 18 (FIG. 3E). Plug inner wall 34 defines a corresponding axial fuel flow passage 36 that extends through the plug from the coupling end 38 of the plug to internally threaded and externally flanged portion 22 (FIG. 3E). When the coupling end portion of the plug is coupled with the coupling end portion of the socket as shown in FIG. 3E, then a single fuel flow passage is defined through the socket and plug.

Socket inner wall 28 also defines a counterbore 40 for receiving the mating plug. An O-ring seal 42 is carried in the counterbore in a circumferential groove 44 in the socket wall 28 to engage plug outer wall 46 upon insertion of the plug into the socket substantially to prevent fluid leakage from the single flow passage when the plug is being inserted into or withdrawn from the socket and when the plug and socket are in coaxial coupled engagement. The seal usefully is made of a resilient material such as rubber or neoprene that has been treated for resistance to ozone degradation and to hydrocarbon fuels.

The flow passage 30 of the socket contains a valve 48 that is spring biased to seat on a radially inwardly projecting portion 50 of socket inner wall 28 that defines counterbore 40. Valve 48 has a substantially cylindrical valve body 52 with a portion 53 that extends axially into the counterbore portion of the flow passage for a purpose explained below. An O-ring seal 54 is provided in a groove 56 circumscribing the valve body 52 adjacent a radially outwardly projecting portion 58 of the valve body axially opposite the counterbore. The seal seats against radially inwardly projecting portion 50 of the socket inner wall 28 when the plug is withdrawn from the socket substantially to preclude leakage of fuel when the plug and socket are not coupled. As with O-ring seal 42, O-ring seal 54 usefully is made of a resilient material that is resistant to ozone degradation and to hydrocarbon fuels.

Valve 48 has a substantially cylindrical valve stem 60 of smaller diameter than the valve body 52 and extending axially from the valve body 52. The valve stem is mounted for reciprocating movement in a spider 62. Spider 62 is held in flow passage 30 against the inner wall 28 of the socket by a snap ring 64. The valve is urged to seal the flow passage in the socket by a helical compression spring 66 that circumscribes a portion of the spider 62 and bears against the valve body. Spring 66 is urged against the spider in which the valve stem is mounted to urge the valve to seat and to seal the flow passage.

Valve body 52 has a portion extending axially beyond portion 50 of the socket inner wall 28 and into the counterbore portion of the flow passage in the socket when the plug and socket are disconnected. The valve body provides a means for actuating the valve to unseat and to open the flow passage 30. The portion 53 of the valve body extending into the counterbore portion of the flow passage is engaged by the coupling end 38 of the plug when the plug is inserted into the socket, as shown in FIG. 3C. The coupling end 38 of the plug bears against valve body portion 53 in opposition to the spring 66 and urges the valve 48 to move axially away from the coupling end of the socket to unseat O-ring seal 54 from engagement with the radially inwardly projecting portion 50 of the wall of the socket and to open the flow passage.

The portion 53 of the valve body that extends axially into the counterbore of the flow passage is shown hollow with a flow passage diameter substantially the same diameter as that of the flow passage of the plug. Projecting portion 53 has a plurality of circumscribing and radially extending apertures 68 for promoting an even flow of fuel around the valve, through the portion 53 extending from the valve body 52, and into the fluid passageway 36 of the plug. The projecting portion of the valve for actuation by the coupling end of the plug can be of a variety of shapes, so long as fluid flow is not impaired by the presence of the projection. Also, the projection 53 or similar valve actuator can be placed instead on the coupling end 38 of the plug for engaging the valve 48.

Mating plug 14 is shown without a corresponding valve in flow passageway 36. The skilled artisan will recognize that typically the socket is connected to the supply side of a gas fuel line and that the plug is connected to the appliance side. Gas pressures for appliances typically do not exceed 0.5 psig, and so, therefore, it is generally not considered necessary to include a valve for stopping the gas from leaking from the plug once the plug and socket are disconnected. At higher pressure applications, it may be desirable to include a somewhat similar valve in the plug. Typically, when a valve is used on each side, the valves abut on coupling and are urged to open the fluid passageway as the plug is inserted in the socket. Also, the skilled artisan will recognize that a number of suitable valves are available. The selection of a valve is governed largely by the fluid flow requirements, namely, type of fluid and pressure of operation.

Moving now to a discussion of the means for releasably securing the plug and socket in coaxial coupled relation, the components of the embodiment of FIG. 1 are shown in exploded perspective in FIG. 2 and in partial longitudinal section in FIGS. 3A through 3E. The plug and socket are connected in coupled relation by a plurality of ball detents 70 carried in a like number of radially directed and circumferentially spaced apertures 72 that are substantially in a single plane in the coupling end portion of the socket adjacent coupling end 32. The ball retaining apertures are tapered toward the flow passage so that the balls are movable radially inwardly to the limit of the taper and are freely movable radially outwardly with respect to the plug. Apertures 72 are somewhat oversize for a purpose to be explained below.

The plug has a first annular ramp 74 (FIG. 2 and FIG. 3C) on its outer surface 46 for urging the ball detents 70 radially outwardly when the plug is being inserted into the socket. A ball receiving race 76 circumscribes the plug outer surface and is engaged by the ball detents to secure the plug in coaxial coupled relation with the socket. A second annular ramp 78 adjacent to the first annular ramp and of opposite slope defines one side wall of the race 76. The second annular ramp 78 urges the ball detents radially outwardly from engagement with the race when the plug is withdrawn from the socket (FIG. 3E).

Ball retaining sleeve 24 is manually slideable for retracting and circumscribes the coupling end portion of the socket for releasably securing the ball detents 70 in engagement with the ball receiving race 76 on the plug. The sleeve has a shoulder 82 (FIGS. 3A through 3E) projecting radially inwardly and having an inclined surface 84 for engaging the ball detents in a radially inward position as shown in FIG. 3E and for transmitting connecting and disconnecting forces to the sleeve for the push-to-connect, pull-to-disconnect, and heat responsive breakaway features. Shoulder 82 is shown as integral, or one piece, with the sleeve 24. Shoulder 82 can be manufactured as a separate element, if desired, to define an additional sleeve that is placed between the sleeve and the socket.

Shoulder 82 defines on one side thereof and axially toward coupling end 32 of the socket, between the sleeve and the socket, a first annular passage 86 into which the ball detents 70 are received in a radially outward position in response to the first and second annular ramps on the plug when the plug is respectively inserted into and removed from the socket. Shoulder 82 defines on the other side thereof opposite first annular passage 86 and between the sleeve and the socket a second annular passage 88.

A helical compression spring 90 (FIG. 2) circumscribes the socket and is located in the second annular passage 88 (FIG. 3E) for longitudinally urging the ball retaining sleeve axially toward the coupling end 32 of the socket and to maintain the ball detents in a radially inward position. Spring 90 urges the ball retaining sleeve against a stop ring 92 to provide an urging means by which the ball retaining sleeve is urged to maintain the ball detents in a radially inward position. The stop ring 92 is matingly mounted on an inclined shoulder 94 of the socket and has a mating surface of opposite slope to the shoulder 94. In this manner, a portion of the horizontal component of force applied to the stop ring 92 by spring 90 is transmitted to shoulder 94.

For the heat responsive breakaway feature, the stop ring 92 comprises a material that is fusible at a predetermined temperature. Inclined surface 94 does not extend radially outwardly from the socket so as to interfere with release of the spring 90 when the stop ring is sufficiently fused. When the stop ring is sufficiently fused, the spring 90 is released and the ball retaining sleeve 24 releases the ball detents from engagement with the race on the plug so that the plug may be released from coaxial coupled relation with the socket.

The stop ring can be formed of a variety of fusible materials. One such material is a synthetic resinous plastic material sold under the trademark DELRIN® by E. I. Du Pont De Nemours and Company. DELRIN® is believed to be a thermoplastic polymeric acetal. DELRIN® has sufficient rigidity in conditions of normal use in the coupling of the invention to provide a stop ring 92 against which spring 90 can be urged to provide an urging means. However, at a selected predetermined temperature, DELRIN® becomes plasticized and loses its rigidity, releasing the spring and in turn releasing the ball detents from engagement with the race on the plug.

Other materials than DELRIN® should also be useful in the practice of the invention to provide a heat responsive breakaway capability. For example, a stop ring could be formed of solder or other suitable fusible material. In addition, the stop ring and shoulder arrangement could be configured differently from that represented in the drawings. For example, the inclined shoulder extending radially outwardly from the socket could be replaced by a circumscribing groove receiving a fusible snap ring for retaining a rigid stop ring or other suitable member. A stop ring could be formed of a material such as steel that remains rigid over a variety of high temperatures.

Alternatively, the spring 90 could be made of a fusible material that would fuse at the desired predetermined temperature to provide a releasable urging means so long as the material provided a spring of sufficient resilience at temperatures of interest to provide secure coupling engagement of the plug and the socket.

For most applications featuring a heat induced breakaway, it will be desirable that the fusible urging means, whether the spring, a snap ring, the stop ring as illustrated, or some combination of these, be made of a material that fuses at a temperature of from about 200° to 350° F.

The push-to-connect, pull-to-disconnect, and heat responsive breakaway features are controlled by the strength of the helical compression spring 90 in combination with the angle of incline of the inclined surface 84 on the radially inwardly projecting shoulder 82 of the ball retaining sleeve. For many applications, the angle of the inclined surface of the shoulder of the ball retaining sleeve will be about 15° from the horizontal. A number of combinations of spring strength and inclined surface angle can be used to achieve the desired results. ANSI Z21.41-1989 sets forth that on devices that incorporate a positive locking means, the axial force to lock or unlock the device plus any additional axial forces to connect or disconnect the device shall not exceed a total of 50 pounds for couplings for use with natural, manufactured and mixed gases, liquified petroleum gases and LP gas-air mixtures at pressures not in excess of one-half psig.

At very steep angles of greater than about 45°, the inclined surface 84 of the shoulder 82 of the ball retaining sleeve would provide too ready a release of the plug from the socket. Similarly, at very slight angles of less than about 5°, the plug would be too difficult to remove from the socket to be considered a pull-to-disconnect coupling or to provide a heat responsive breakaway feature. The force required for uncoupling the coupling members can be adjusted within a fairly wide range, and can be up to about 50 pounds for most relatively low pressure fluid flow applications. As a practical matter, the coupling of the invention is useful for low pressure natural gas fuel applications, which are typically at about 0.5 to 1 psig or less. The skilled artisan should recognize that seals, valves, and the specific materials that comprise the components of the coupling will need to be selected for the particular application, depending on the operating pressures, safety requirements, the composition of the fluid, on whether the fluid is a liquid or a gas.

The socket 12 also includes a snap ring 98 received in a groove 100 extending circumferentially about the periphery of the socket proximate the coupling end 32 of the coupling end portion of the socket. The sleeve 24 includes a radially inwardly projecting lip 102 for engaging snap ring 98 and for limiting movement of the sleeve toward the coupling end of the socket.

Also as shown in FIGS. 3A through 3E, the radially inwardly projecting shoulder 82 of the ball retaining sleeve 24 includes adjacent the inclined surface 84 a chamfered portion 104. The chamfered portion is cut in an angle of approximately 45° from the horizontal and is included to enable the ball detents 70 fully to occupy the annular passage 86 in the sleeve when the plug is being inserted in or withdrawn from the socket as shown in FIG. 3D.

Push-to-connect operation of the coupling is as follows. FIG. 3A shows the plug and socket aligned for coaxial coupling. Plug 14 includes a tapered portion 106 at the coupling end 38 thereof for ease in inserting the plug into the counterbore 40 of the socket as shown in FIG. 3B. As the plug is inserted into the socket (FIG. 3B), the outer wall 46 of the plug engages O-ring seal 42 (FIG. 3C) axially away from the coupling end 38 and beyond tapered portion 106 substantially to preclude any leakage of fuel from the socket. The plug then engages the projecting portion 53 of valve 48 to open the flow passageway 30 for flow of gas fuel. As the valve is being urged axially away from the coupling end of the socket (FIG. 3C), first inclined annular ramp 74 engages ball detents 70 and urges them radially outwardly in opposition to the spring 90 for the ball retaining sleeve. The component of force transmitted by the first annular ramp through the ball detents to the inclined surface 84 includes a horizontal component in opposition to the spring 90. The ball retaining sleeve is thereby urged axially away from the coupling end of the socket to compress spring 90 and to open annular passage 86 for receipt of ball detents 70 in a radially outward position. Valve spring 66 is also compressed by the coupling force applied to the plug.

It should be recognized that the sleeve can be moved by hand axially away from the coupling end of the socket in opposition to the spring 90 to open annular passage 86 for receipt of the ball detents. The plug and socket can then be engaged in coaxial coupled relation by applying that force that is necessary to compress valve spring 66.

As shown in FIG. 3D, the ball detents fully occupy annular passageway 86 in the sleeve at the transition point of the first annular ramp 74 to the adjacent second annular ramp 78 of opposite slope. Sleeve 24 is at its most extreme position axially away from the coupling end of the socket. The ball retaining sleeve spring 90 is fully compressed. At the transition point between the first and second annular ramps on plug 14, spring 90 is released to urge ball retaining sleeve 24 axially toward a ball retaining position. The ball detents are urged into ball receiving race 76 on the plug and the sleeve snaps into its ball retaining position under the urging of the socket sleeve spring (FIG. 3E). The socket and plug are secured in coaxial coupled relation. Axial movement of the socket sleeve beyond the coupling end of the socket is precluded by the snap ring and the radially inwardly projecting shoulder of the socket sleeve. Flow passage 30 is now fully opened.

For removal of the plug from the socket as a pull-to-disconnect coupling, the second annular ramp 78 that forms one of the side walls of the race 76 cammingly engages the balls and urges them radially outwardly in response to opposing separating forces applied to the socket and plug, such as by pulling on an appliance. The second annular ramp transmits through the ball detents to the inclined surface of the ball retaining sleeve a component of force that is in opposition to the spring 90 in a manner analogous to the push-to-connect feature. The component of force is provided by the compressed valve spring 66 in combination with the opposing separating forces. The sleeve is urged axially away from the ball retaining position to open annular passage 86 for receipt of the ball detents in a radially outward position.

Once the ball detents reach the transition point between the first and second annular ramps, the valve spring and the ball retaining sleeve spring both contribute to eject the plug from the socket. Alternatively, an operator can retract the ball retaining sleeve by hand to open passage 86 for receipt of the ball detents and to eject the plug from the socket.

The ball retaining sleeve can also be released at a predetermined temperature to open passage 86 for receipt of the ball detents and to eject the plug from the socket. Fusible stop ring 92 fuses at the predetermined temperature and loses its rigidity, which causes the spring 90 to be released and to release the ball retaining sleeve. Compressed valve spring 66 then urges the plug axially out of engagement with the socket. The ball detents are urged radially outwardly against inclined surface 84 on the ball retaining sleeve and urge the sleeve axially away from a ball retaining position. Once the ball detents reach the transition point between the first and second annular ramps, the valve spring ejects the plug from the socket. The valve is reseated and fuel flow is shut off.

The invention claimed herein has been described with specific reference to preferred embodiments. However, variations can be made within the spirit and scope of the invention as described in the foregoing specification and as defined in the appended claims. While the invention has been described with reference to preferred embodiments, it should be understood that the invention is not intended to be limited to the embodiments illustrated in the drawings, to gas fuel systems, or to systems operating at pressures of only 0.5 psig. On the contrary, the invention includes all alternatives, modifications, and equivalents that may be included within the spirit and the scope of the invention as defined by the appended claims. For example, the skilled artisan will recognize that the couplings of the invention can be adapted for operation with either liquid or gaseous fluids and for fluids other than gas fuel.

What is claimed is:

1. A fluid coupling for fluid conducting lines, said coupling comprising:

a generally cylindrical first member having an axial fluid flow passage therethrough and a coupling end portion;

a generally cylindrical second member having a coupling end portion that is coupleable with said coupling end portion of said first member for coaxial coupled relation between said first and second members, said second member having a corresponding axial flow passage therethrough so that when said coupling end portion of said second member is coupled with said coupling end portion of said first member a single fluid flow passage is defined through said first and second members; and means for releasably securing said first and second members in coaxial coupled relation for the flow of fluid therethrough, said means cooperating with said first and second members and comprising:

a) at least one detent carried by said first member;
   b) means located on said second member for said detent to engage for coaxial coupled relation of said first and second members;
   c) means for releasably securing said detent in engagement with said means on said second member;
   d) a helical compression spring circumscribing said first member to which said detent securing means is responsive; and
   e) a surface mounted on said first member against which said spring is biased to urge said detent securing means toward a detent securing position, said surface comprising a material fusible at a predetermined temperature to effect release of the coupled relation and interrupt the flow of fluid through said first and second members.

2. A fluid coupling for fluid conducting lines, said coupling comprising:

a generally cylindrical socket having an axial fluid flow passage therethrough and a coupling end portion;

a generally cylindrical mating plug having a coupling end portion that is coupleable with said coupling end portion of said socket for coaxial coupled relation between said socket and said mating plug, said mating plug having a corresponding axial flow passage therethrough so that when said coupling end portion of said mating plug is coupled with said coupling end portion of said socket a single fluid flow passage is defined through said socket and said mating plug;

a plurality of ball detents carried in radially directed and circumferentially spaced apertures in said coupling end portion of said socket;

a ball receiving race circumscribing said plug that is engaged by said ball detents to secure said plug in coaxial coupled relation with said socket;

a ball retaining sleeve circumscribing said coupling end portion of said socket for releasably securing said ball detents in engagement with said race on said plug, said sleeve having a shoulder projecting radially inwardly and having an inclined surface for engaging said ball detents in a radially inward position, said shoulder defining on one side thereof between said sleeve and said socket a first annular passage into which said ball detents are received in a radially outward position for inserting and removing said plug from said socket, said shoulder defining on the other side thereof between said sleeve and said socket a second annular passage;

a helical compression spring circumscribing said socket and located in said second annular passage for longitudinally urging said ball retaining sleeve to maintain said ball detents in a radially inward position; and a stop ring associated with said spring and against which said spring urges said ball retaining sleeve to maintain said ball detents in a radially inward position, said stop ring comprising a material fusible at a predetermined temperature, whereby at said predetermined temperature, said stop ring is fused, said spring is released, and said ball retaining sleeve releases said ball detents from engagement with said race on said plug so that said plug may be released from coaxial coupled relation with said socket.

3. A fluid coupling according to claim 2 wherein said socket includes an inclined shoulder about its circumference against which said stop ring is matingly mounted.

4. A fluid coupling according to claim 2 wherein said ball retaining sleeve and said projecting shoulder are separate elements, said projecting shoulder defining an additional sleeve circumscribing said socket radially inwardly of said ball retaining sleeve.

5. A fluid coupling according to claim 2 wherein said plug has:

a first annular ramp adjacent said race on said plug for urging said ball detents radially outwardly when said plug is inserted into said socket so that said ball detent may be received into said first annular passage defined by said socket and said sleeve, whereby said plug may be fully inserted into said socket, said ball detents may engage said race, and said spring may urge said ball retaining sleeve to secure said ball detents in said race, and a second annular ramp adjacent said first annular ramp and of opposite slope, said second annular ramp defining one side wall of said race, said second annular ramp urging said ball detents radially outwardly when said plug is withdrawn from said socket so that said ball detent may be received into said first annular passage defined by said socket and said sleeve, whereby said plug may be withdrawn from said socket.

6. A fluid coupling according to claim 2 wherein said socket includes about the periphery thereof a circumferential groove proximate the coupling end of said coupling end portion of said socket, said groove receiving a snap ring, and said sleeve including a radially inwardly projecting lip for engaging said snap ring for limiting movement of said sleeve toward said coupling end of said socket.

7. A ball detent fluid coupling comprising:

a generally cylindrical socket having an axial fluid flow passage therethrough and a coupling end portion for receiving a corresponding plug;

a generally cylindrical mating plug having a coupling end portion that is coupleable with said coupling end of said socket for coaxial coupled relation between said socket and said plug, said plug having a corresponding axial flow passage therethrough so that when said coupling end portion of said plug is received in said socket, a single fluid flow passage is defined through said coupling;

a plurality of ball detents carried in radially directed and circumferentially spaced apertures substantially in a single plane in said coupling end portion of said socket;

a first annular ramp on said plug for urging said ball detents radially outwardly when said plug is being inserted into said socket;

a race circumscribing said plug that is engaged by said ball detents to secure said plug in coaxial coupled relation with said socket, one side wall of said race being defined by a second annular ramp that is adjacent said first annular ramp and is of opposite slope, said second annular ramp urging said ball detents radially outwardly when said plug is withdrawn from said socket;

a slidable ball retaining sleeve circumscribing said coupling end portion of said socket for releasably securing said ball detents in engagement with said race on said plug, said sleeve having a shoulder projecting radially inwardly and having an inclined surface for engaging said ball detents in a radially inward position, said shoulder defining on one side thereof between said sleeve and said socket a first annular passage into which said ball detents are received in a radially outward position in response to said first and second annular ramps on said plug when said plug is respectively inserted into and removed from said socket, said shoulder defining on the other side thereof between said sleeve and said socket a second annular passage;

a helical compression spring circumscribing said socket and located in said second annular passage normally longitudinally urging said ball retaining sleeve to maintain said ball detents in a radially inward position, said ball retaining sleeve being responsive to a sliding movement for retracting in opposition to said helical compression spring to release said ball detents, and said inclined surface of said inwardly projecting shoulder being urged by a predetermined separating force applied to at least one of said socket and plug in opposition to said spring to release said ball detents when said ball detents are urged radially outwardly by said first and second ramps on said plug, whereby said plug is released from secured coaxial coupled relation;

a valve mounted in the fluid flow passage of said socket and having a valve spring associated therewith urging said valve in opposition to said ball retaining sleeve to eject said plug from said coupling end portion of said socket and to close said fluid flow passage, said valve ejecting said plug from said socket and closing said passage when said ball retaining sleeve is released;

an inclined shoulder extending radially outwardly from said socket; and a stop ring matingly mounted on said inclined shoulder on said socket and against which said spring urges said ball retaining sleeve to maintain said ball detents in a radially inward position, said stop ring comprising a material that is fusible at a predetermined temperature, whereby when said stop ring fuses at said predetermined temperature, said spring is released from urging said ball retaining sleeve in a ball retaining position and said valve ejects said plug from said socket and closes said flow passage.

8. A socket component for a quick-disconnect fluid coupling for fluid conducting lines, the coupling having a generally cylindrical mating plug defining a coupling end portion for being received in said socket, the plug having an axial fluid flow passage therethrough, a first annular ramp for urging ball detents radially outwardly when the plug is being inserted into said socket, and a race circumscribing the plug that is engaged by ball detents to secure the plug in coaxial coupled relation with said socket, one side wall of the race being defined by a second annular ramp that is adjacent to the first annular ramp and is of opposite slope, the second annular ramp urging the ball detents radially outwardly when the plug is withdrawn from said socket, wherein said socket component comprises:

a generally cylindrical socket having an axial fluid flow passage therethrough and a coupling end portion for receiving the corresponding mating plug so that when said socket and the mating plug are joined in coaxial coupled relation, a single fluid flow passage is defined through the plug and said socket;

a plurality of ball detents retained in ball retaining apertures defined by said socket for securing the mating plug in coaxial coupled relation with said socket;

a slidable ball retaining sleeve circumscribing said coupling end portion of said socket for releasably securing said ball detents in engagement with said race on said plug, said sleeve having a shoulder projecting radially inwardly and having an inclined surface for engaging said ball detents in a radially inward position, said shoulder defining on one side thereof between said sleeve and said socket a first annular passage into which said ball detents are received in a radially outward position in response to said first and second annular ramps on said plug when said plug is respectively inserted into and removed from said socket, said shoulder defining on the other side thereof between said sleeve and said socket a second annular passage;

a helical compression spring circumscribing said socket and located in said second annular passage normally longitudinally urging said ball retaining sleeve to maintain said ball detents in a radially inward position, said ball retaining sleeve being responsive to a sliding movement for retracting in opposition to said helical compression spring to release said ball detents, and said inclined surface of said inwardly projecting shoulder being urged by a predetermined separating force applied to at least one of said socket and plug in opposition to said spring to release said ball detents when said ball detents are urged radially outwardly by said first and second ramps on said plug, whereby said plug is released from secured coaxial coupled relation;

a valve mounted in the fluid flow passage of said socket and having a valve spring associated therewith urging said valve in opposition to said ball retaining sleeve to eject said plug from said coupling end portion of said socket and to close said fluid flow passage, said valve ejecting said plug from said socket and closing said passage when said ball retaining sleeve is released;

an inclined shoulder extending radially outwardly from said socket; and a stop ring matingly mounted on said inclined shoulder on said socket and against which said spring urges said ball retaining sleeve to maintain said ball detents in a radially inward position, said stop ring comprising a material that is fusible at a predetermined temperature, whereby when said stop ring fuses at said predetermined temperature, said spring is released from urging said ball retaining sleeve in a ball retaining position and said valve ejects the plug from said socket and closes said flow passage.

9. A fluid coupling according to claim 1 wherein said surface comprises a material fusible at a predetermined temperature of less than about 350° F.

10. A fluid coupling according to claim 1 wherein said surface comprises a thermoplastic material.

11. A fluid coupling according to claim 1 wherein said releasable securing means includes means for urging said first and second members to separate when the coupled relation is released.

* * * * *